United States Patent [19]

Imura et al.

[11] 4,102,946

[45] Jul. 25, 1978

[54] PROCESS FOR CARBOXYLATION OF ETHYLENE-VINYL ACETATE COPOLYMERS OR SAPONIFIED COPOLYMERS

[75] Inventors: Shinichi Imura; Mitsutaka Saito; Nobuo Morishita, all of Shin-nanyo, Japan

[73] Assignee: Toyo Soda Manufacturing Co., Ltd., Japan

[21] Appl. No.: 756,869

[22] Filed: Jan. 4, 1977

[30] Foreign Application Priority Data

Mar. 19, 1976 [JP] Japan .................. 51/29338

[51] Int. Cl.$^2$ ............................................. C08F 263/04
[52] U.S. Cl. ................................................... 260/878 R
[58] Field of Search .................................. 260/878 R

[56] References Cited

U.S. PATENT DOCUMENTS

| | | | |
|---|---|---|---|
| 3,305,606 | 2/1967 | Hardt et al. | 260/878 R |
| 3,355,516 | 11/1967 | Hardt et al. | 260/878 R |
| 3,737,483 | 6/1973 | Kosaka et al. | 260/878 R |
| 3,749,756 | 7/1973 | Kosaka et al. | 260/878 R |
| 3,808,294 | 4/1974 | Sato et al. | 260/878 R |
| 3,949,019 | 4/1976 | Zeitlev et al. | 260/878 R |
| 3,950,209 | 4/1976 | Kosaka et al. | 260/878 R |

*Primary Examiner*—Alan Holler
*Attorney, Agent, or Firm*—Oblon, Fisher, Spivak, McClelland & Maier

[57] ABSTRACT

Ethylene-vinyl acetate copolymers or saponified copolymers are carboxylated by copolymerizing an alpha, beta-unsaturated carboxylic acid and/or anhydride thereof with or without at least one vinylidene monomer having the formula:

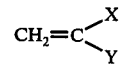

wherein X and Y can be the same or different, and each represents hydrogen, chlorine, alkyl, acetoxy, carboxylic acid ester group or cyano; with an ethylene-vinyl acetate copolymer or a saponified copolymer thereof in the presence of a polymerization initiator in a reaction medium of an acetic acid ester or a mixture of an acetic acid ester and a lower alcohol, wherein the reaction is conducted in a heterogeneous state.

10 Claims, No Drawings

PROCESS FOR CARBOXYLATION OF ETHYLENE-VINYL ACETATE COPOLYMERS OR SAPONIFIED COPOLYMERS

BACKGROUND OF THE INVENTION

1. Field of the Invention

The present invention relates to a process for the carboxylation of ethylene-vinyl acetate copolymers or saponified copolymers. More particularly, the present invention relates to a process in which carboxylic acid residues are incorporated into an ethylene-vinly acetate copolymer or saponified copolymer thereof such that the resultant product maintains the physical form of the original copolymer such as the powdered or pelletized form of the copolymer.

2. Description of the Prior Art

Various attempts have been made to introduce carboxylic acid residues into ethylenic polymers such as ethylene-vinyl acetate copolymers in order to substantially improve the bonding characteristics of the copolymers without deterioration of the excellent properties of the ethylene-vinyl acetate copolymers such as softness, melt flowability, toughness and adhesion. Such a chemical modification has been performed on ethylene-vinyl acetate copolymers by a method in which the reaction is conducted in the molten state and by a method in which the polymer is dissolved in a solvent and the reaction is performed in solution. No method is known in which the reaction can be conducted conveniently while maintaining the original form of the polymer, for example, as a powdered or pelletized material.

If carboxylation of a copolymer can be accomplished by a heterogeneous reaction in which the original powdered or pelletized form of the polymer is retained, such complicated steps which are inherent in the conventional solution method, as dissolution of the polymer before the reaction, separation of the carboxylated polymer and pelletization of the separated polymer, will become unnecessary. Such a method would have industrial advantages.

SUMMARY OF THE INVENTION

Accordingly, one object of the present invention is to provide a method for the introduction of carboxylate groups into ethylene-vinyl acetate copolymer or saponified copolymer thereof without altering the physical form of the starting copolymer material.

Another object of the present invention is to provide an ethylene-vinyl acetate copolymer or a saponified copolymer thereof which has improved melt adhesion characteristics.

Briefly, these objects and other objects of the present invention as hereinafter will become more readily apparent can be attained in a method of carboxylating ethylene-vinyl acetate copolymer or saponified copolymer thereof by copolymerizing an alpha-beta-unsaturated carboxylic acid and/or anhydride thereof with or without at least one vinylidene monomer having the formula:

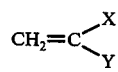

wherein X and Y can be the same or different and each represents hydrogen, chlorine, alkyl, acetoxy, carboxylic acid ester or cyano; with an ethylene-vinyl acetate copolymer or saponified copolymer in the presence of a polymerization initiator in a reaction medium of an acetic acid ester or a mixture of an acetic acid ester and a lower alcohol, wherein the reaction is conducted in a heterogeneous state.

DETAILED DESCRIPTION OF THE PREFERRED EMBODIMENTS

The carboxylated ethylene-vinyl acetate copolymer or saponified copolymer product of the present invention is prepared by copolymerizing an ethylene-vinyl acetate copolymer or saponified copolymer thereof and an alpha, beta-unsaturated carboxylic acid and/or anhydride thereof with or without a vinylidene monomer having the above formula. The specific type of copolymer, acid and/or anhydride and vinylidene monomer components chosen depends upon the intended use of the resulting carboxylated polymer. In general, 99 to 50 parts by weight of an ethylene-vinyl acetate copolymer or a saponified copolymer thereof is reacted with 1 to 50 parts by weight of mixture of an alpha, beta-unsaturated carboxylic acid and/or anhydride thereof and a vinylidene monomer. It is especially preferred that 0.1 to 20 parts by weight of an alpha, beta-unsaturated carboxylic acid and/or anhydride thereof be copolymerized with 0 to 40 parts by weight of a vinylidene monomer in the presence of 95 to 50 parts by weight of an ethylene-vinyl acetate copolymer or a saponified copolymer thereof.

An ethylene-vinyl acetate copolymer which is used in the present invention can be prepared by a high pressure polymerization method conducted under 1,000 to 3,000 atmospheres or by a conventional solution or emulsion polymerization method.

It is preferred that the vinyl acetate content of the ethylene-vinyl acetate copolymer be in the range of 1 to 50% especially 10 to 40% by weight and that the melt index be in the range of 0.1 to 500 g/10 min. The saponified ethylene-vinyl acetate copolymer is produced by saponifying the ethylene-vinyl acetate copolymer (1 to 50% by weight of vinyl acetate) at a rate of 1 to 100% with an alkali such as sodium hydroxide, potassium hydroxide, sodium methoxide or an acid such as sulfuric acid, in a uniform system using a solvent such as hexane, toluene etc. or in a non-uniform system using a non-solvent such as methanol. The saponified ethylene-vinyl acetate copolymer has 0.1 to 500 g/10 min. of the melt index.

Suitable alpha, beta-unsaturated carboxylic acids or their anhydrides which can be employed include, for example, acrylic acid, methacrylic acid, maleic acid, fumaric acid, itaconic acid, the methyl and ethyl hydrogen esters of maleic acid and fumaric acid, maleic anhydride and itaconic anhydride. Acrylic acid, fumaric acid, maleic anhydride and methacrylic acid are especially preferred. These monomers may be used singly or in combination.

Suitable vinylidene monomers which can be used in the present invention have the following formula:

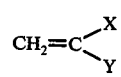

wherein X and Y can be the same or different, and each represents hydrogen, chlorine, alkyl, acetoxy, carboxylic acid ester, or cyano. Specific examples of vinylidene monomers include ethylene, propylene, isobutene, butene-1, octene-1, vinyl chloride, vinylidene chloride, vinyl acetate, methyl acrylate, ethyl acrylate, butyl acrylate, octyl acrylate, methyl methacrylate, vinyl chloroacetate and acrylonitrile. Ethylene, propylene, vinyl acetate, acrylic acid esters, methacrylic esters and vinyl chloride are preferred monomers.

Suitable radical initiators which can be used as the polymerization initiator in the present method include the polymerization initiators well known to those skilled in the art. The initiators preferably include dialkyl peroxides such as di-t-butyl peroxide; peroxy esters such as t-butyl peroctoate, t-butyl peracetate and t-butyl perpivalate, and diacyl peroxides such as benzoyl peroxide and acetyl peroxide. The radical initiator can be used in an amount of 0.1 to 50% especially 1 to 10% by weight based on the monomer mixture.

The primary objective of the present invention is to conduct the reaction smoothly and conveniently while maintaining the polymer in its original powdered or pelletized form. In order to achieve this object sufficiently, the polymerization is preferably conducted at a temperature a little higher than the Vicat softening point of the starting ethylene-vinyl acetate copolymer as determined from the standardized procedure set forth in ASTM D-1525-65T. That is, the polymerization is conducted at a temperature in the range of room temperature to a temperature higher by up to 30° C, than the Vicat softening point of the starting polymer. In general, the reaction temperature is selected within the range of room temperature to 100° C depending on the vinyl acetate content of the starting ethylene-vinyl acetate copolymer, and it is especially preferred that the polymerization be conducted at a temperature a little higher than the Vicat softening point of the starting ethylene-vinyl acetate copolymer.

A further important consideration in order to attain the object of the present invention is the selection of a suitable reaction medium. Suitable reaction media preferably include acetic acid esters such as methyl acetate, ethyl acetate and butyl acetate and mixture of these acetic acid esters with lower alcohols such as methanol, ethanol, isopropanol and butanol. When a lower alcohol is employed, good results can be obtained by using a mixture comprising 100 parts by weight of an acetic acid ester and up to 50 parts by weight, preferably up to 30 parts by weight, of a lower alcohol.

The carboxylated copolymer obtained by the process of the present invention is a polymer composition consisting essentially of the ethylene-vinyl acetate copolymer or the saponified copolymer thereof copolymerized with the alpha, beta-unsaturated carboxylic acid and/or anhydride thereof with or without the vinylidene monomer as well as a copolymer of these monomers which is mixed with the copolymer. The carboxylated copolymer obtained according to the process of the present invention possesses physical properties which vary over a broad range depending on the kinds and amounts of the constituents.

In general, the carboxylated copolymer obtained according to the process of the present invention has an acid value of 0.1 to 100, especially 1-100 mg KOH/g, and its bonding properties are substantially improved over the basic ethylene-vinyl acetate copolymer or the saponified copolymer.

The polymer of the present invention possesses excellent melt-adhesive or melt-bonding properties to not only such metals as iron and aluminum, but also materials having a smooth surface, such as polyolefins, vinyl chloride resins, ABS resins and cellophanes.

Moreover, because the excellent melt flowability and moldability properties inherent in the basic ethylene-vinyl acetate copolymer or saponified copolymer are retained in the polymer of the present invention, the polymer product of the present invention is very useful and valuable as a resin for extrusion coating, as a film adhesive or as an adhesive for the production of a laminated structure.

Having generally described the invention, a more complete understanding can be obtained by reference to certain specific examples, which are provided herein for purposes of illustration only and are not intended to be limiting unless otherwise specified. In the Examples, terms "parts" and "%" are by weight.

The saponified ethylene-vinyl acetate copolymers used in Examples 10, 11 and 12 were produced by the following processes.

(1) In a 5 liter autoclave equipped with a stirrer, 600 g of ethylene-vinyl acetate copolymer (vinyl acetate content of 28% and melt index of 20 g/10 min.) was charged and nitrogen gas was fed to purge air, and 3 kg of methanol and 150 g of sodium hydroxide were charged and the reaction was carried out at 90° C for 6 hours. After the reaction, hydrochloric acid was added to neutralize the reaction mixture. The reaction product was filtered and washed in water and dried under a reduced pressure. The resulting polymer had the original shape of the pellets of the starting material and was the saponified ethylene-vinyl acetate copolymer stated in Example 10.

(2) The process of (1) was repeated except using 50 g of sodium hydroxide and reacting at 70° C for 3 hours. The resulting polymer was the saponified ethylene-vinyl acetate copolymer stated in Example 11.

(3) The process of (1) was repeated except using 600 g of ethylene-vinyl acetate copolymer (vinyl acetate content of 28% and melting index of 400 g/10 min.) and reacting at 75° C for 8 hours. The resulting polymer was the saponified ethylene-vinyl acetate copolymer stated in Example 12.

EXAMPLE 1

The following components were charged into a 1-liter capacity glass reactor equipped with a reflux cooler, a thermometer, a nitrogen introduction inlet and an agitator and the carboxylation reaction was conducted in the following manner:

| | | |
|---|---:|---|
| Ethylene-vinyl acetate copolymer (vinyl acetate content = 20%, melt index = 20 g/10 min, Vicat softening point = 58° C). | 150 | g |
| Vinyl acetate | 10 | g |
| Fumaric acid | 5 | g |
| Benzoyl peroxide | 0.5 | g |
| Ethyl acetate | 500 | g |
| Methanol | 100 | g |

The ethylene-vinyl acetate copolymer and fumaric acid were charged into the reaction vessel and the atmosphere in the reactor was thoroughly replaced by nitrogen. Then, vinyl acetate, benzoyl peroxide, ethyl acetate and methanol were charged into the reaction vessel, and the polymerization was conducted at 66° C for 6 hours under reflux conditions.

Under the above polymerization conditions, the charged ethylene-vinyl acetate copolymer retained its original pelletized from and such problems as fusion and agglomeration were not encountered. After completion of the reaction, the polymer pellets were recovered by filtration, immersed in and washed with methanol and dried in vacuo. The polymer obtained by this method was found to have a melt index of 16.1 g/10 min. and an acid value of 6.1 mg KOH/g.

The peeling strength of an aluminum/aluminum bonded structure having an adhesive layer of the polymer obtained above in a thickness of 100μ was 14.5 Kg/25 mm..

When the polymerization reaction was conducted in a homogeneous system in toluene as the solvent according to the above procedure, the resulting polymer was found to have a melt index of 10.5 g/10 min., an acid value of 1.2 mg KOH/g and an aluminum/aluminum bonding strength of 4.5 Kg/25 mm.. It is apparent from these results, that there is a very substantial difference in the properties of the carboxylated product depending upon the solvent used. Of course, the data show that the acetic acid ester is the preferred solvent. It should be noted that the starting ethylene-vinyl acetate copolymer used in this Example was found to have an aluminum/aluminum bonding strength of 3.6 Kg/25 mm..

EXAMPLE 2

The following components were charged into a 2-liter capacity autoclave equipped with a stirrer and the carboxylation reaction was conducted in the following manner.

| Ethylene-vinyl acetate copolymer (vinyl acetate content = 20%, melt index = 20 g/10 min., Vicat softening point = 58° C). | 300 | g |
|---|---|---|
| Methyl methacrylate | 20 | g |
| Fumaric acid | 10 | g |
| Benzoyl peroxide | 1 | g |
| Ethyl acetate | 1000 | g |
| Methanol | 200 | g |

The ethylene-vinyl acetate copolymer and fumaric acid were charged into the reaction vessel and the internal atmosphere were thoroughly replaced by nitrogen. Then, methyl methacrylate, benzoyl peroxide, ethyl acetate and methanol were charged into and sealed in the reaction vessel, and the polymerization reaction was conducted at 66° C for 6 hours. Under the above polymerization conditions, the charged ethylene-vinyl acetate copolymer retained its original form and problems such as fusion and agglomeration were not encountered. After completion of the reaction, the polymer pellets were recovered by filtration, immersed in and washed with methanol and dried in vacuo. The obtained polymer was found to have a melt index of 16.5 g/10 min. and an acid value of 1.9 mg KOH/g. The peeling strength of an aluminum/aluminum bonded structure having an adhesive layer of the polymer obtained above in a thickness of 100μ was 15.0 Kg/25 mm..

EXAMPLE 3

In the same manner as described in Example 2, carboxylation was conducted by using the following components.

| Ethylene-vinyl acetate copolymer (vinyl acetate content = 20%, melt index = 20 g/10 min., Vicat softening point = 58° C). | 300 | g |
|---|---|---|
| Propylene | 15 | g |
| Fumaric acid | 10 | g |
| Benzoyl peroxide | 1 | g |
| Ethyl acetate | 1000 | g |
| Methanol | 200 | g |

The polymer obtained retained the form of the starting copolymer and was found to have a melt index of 15.4 g/10 min. and an acid value of 2.1 mg KOH/g.

The peeling strength of an aluminum/aluminum bonded structure having an adhesive layer of the polymer obtained above in a thickness of 100μ was 15.1 Kg/25 mm.

EXAMPLE 4

In the same manner as described in Example 2, the carboxylation reaction was conducted with the following components.

| Ethylene-vinyl acetate copolymer (vinyl acetate content = 20%, melt index = 20 g/10 min., Vicat softening point = 58° C). | 300 | g |
|---|---|---|
| Vinyl acetate | 20 | g |
| Maleic anhydride | 10 | g |
| Benzoyl peroxide | 1 | g |
| Ethyl acetate | 1000 | g |
| Methanol | 200 | g |

The polymer obtained retained the original form of the charged copolymer and it was found to have a melt index of 14.3 g/10 min. and an acid value of 0.73 mg KOH/g. The peeling strength of an aluminum/aluminum bonded structure having an adhesive layer of the polymer obtained above in a thickness of 100μ was 11.9 Kg/25 mm..

EXAMPLE 5

In the same manner as described in Example 2, the carboxylation reaction was conducted with the following components.

| Ethylene-vinyl acetate copolymer (vinyl acetate content = 20%, melt index = 20 g/10 min., Vicat softening point = 58° C). | 300 | g |
|---|---|---|
| Vinyl acetate | 20 | g |
| Fumaric acid | 10 | g |
| Benzoyl peroxide | 1 | g |
| Methyl acetate | 1000 | g |
| Methanol | 200 | g |

The polymer obtained retained the original form of the starting copolymer and it was found to have a melt index of 16.5 g/10 min. and an acid value of 1.6 mg KOH/g. The peeling strength of an aluminum/aluminum bonded structure having an adhesive layer of the polymer obtained above in a thickness of 100μ was 14.7 Kg/25 mm..

EXAMPLE 6

A carboxylation reaction was conducted in the same manner as described in Example 2 with the following components except that the polymerization temperature was changed to 60° C.

| | | |
|---|---:|---|
| Ethylene-vinyl acetate copolymer (vinyl acetate content = 32%, melt index = 30 g/10 min., Vicat softening point = 35° C). | 300 | g |
| Vinyl acetate | 20 | g |
| Fumaric acid | 10 | g |
| t-Butyl perpivalate | 1 | g |
| Ethyl acetate | 1000 | g |
| Methanol | 200 | g |

The polymer obtained retained the original form of the charged copolymer and it was found to have a melt index of 24.4 g/10 min. and an acid value of 4.8 mg KOH/g. The peeling strength of an aluminum-/aluminum bonded structure having an adhesive layer of the polymer obtained above in a thickness of 100μ was 19.8 Kg/25 mm.. The starting ethylene-vinyl acetate copolymer used in this Example was found to have an aluminum/aluminum bonding strength of 5.5 Kg/25 mm..

EXAMPLE 7

The following components were charged into a 2-liter capacity autoclave equipped with an agitator, and the carboxylation reaction was conducted in the following manner:

| | | |
|---|---:|---|
| Ethylene-vinyl acetate copolymer (vinyl acetate content = 20%, melt index = 20 g/10 min., Vicat softening point = 58° C) | 450 | g |
| Fumaric acid | 15 | g |
| Ethyl acetate | 560 | g |
| Methanol | 440 | g |
| Benzoyl peroxide | 1.5 | g |

The ethylene-vinyl acetate copolymer and fumaric acid were charged into the autoclave and the atmosphere in the autoclave was thoroughly replaced by nitrogen. Then, ethyl acetate, methanol and benzoyl peroxide were charged into the autoclave, and the polymerization was conducted at 70° C for 6 hours.

Under the above polymerization conditions, the charged ethylene-vinyl acetate copolymer retained its original pelletized form and such problems as fusion and agglomeration were not encountered. After completion of the reaction, the polymer pellets were recovered by filtration, immersed in and washed with methanol and dried in vacuo. The polymer obtained by this method was found to have a melt index of 16.7 g/10 min. and an acid value of 1.7 mg KOH/g. The peeling strength of an aluminum/aluminum bonded structure having an adhesive layer of the polymer obtained above in a thickness of 100μ was 10.3 Kg/25 mm.

When the reaction was conducted in a uniform system by using toluene as the solvent instead of methanol, the polymer had a melt index of 9.0 g/10 min. and an acid value of 2.0 mg KOH/g. The peeling strength of an aluminum/aluminum bonded structure having an adhesive layer of the polymer obtained above in a thickness of 100μ was 4.8 Kg/25 mm. whereas that of the ethylene-vinyl acetate copolymer as the starting material was 3.6 Kg/25 mm..

EXAMPLE 8

In the same manner as described in Example 7, the carboxylation was conducted with the following components:

| | | |
|---|---:|---|
| Ethylene-vinyl acetate copolymer (vinyl acetate content = 20%, melt index = 20 g/10 min., Vicat softening point = 57° C) | 450 | g |
| Fumaric acid | 15 | g |
| Ethyl acetate | 850 | g |
| Methanol | 150 | g |
| Benzoyl peroxide | 1.5 | g |

The polymer obtained retained the form of the starting copolymer and was found to have a melt index of 14.3 g/10 min. and an acid value of 1.5 mg KOH/g.

The peeling strength of an aluminum/aluminum bonded structure having an adhesive layer of the polymer obtained above in a thickness of 100μ was 10.5 Kg/25 mm..

EXAMPLE 9

In the same manner as described in Example 7, the carboxylation reaction was conducted with the following components:

| | | |
|---|---:|---|
| Ethylene-vinyl acetate copolymer (vinyl acetate content = 10%, melt index = 20 g/10 min., Vicat softening point = 75° C). | 500 | g |
| Fumaric acid | 30 | g |
| Ethyl acetate | 900 | g |
| Methanol | 100 | g |
| Benzoyl peroxide | 1.5 | g |

The polymer obtained retained the original form of the charged copolymer and it was found to have a melt index of 5.0 g/10 min., and an acid value of 3.0 mg KOH/g. The peeling strength of an aluminum-/aluminum bonded structure having an adhesive layer of the polymer obtained above in a thickness of 100μ was 8.0 Kg/25 mm, whereas that of the ethylene-vinyl acetate copolymer as the starting material was 1.8 Kg/25 mm.

EXAMPLE 10

In the same manner as described in Example 7, the carboxylation reaction was conducted with the following components at 50° C for 6 hours.

| | | |
|---|---:|---|
| Saponified ethylene-vinyl acetate copolymer (vinyl acetate content = 28%, melt index = 18 g/10 min., saponification rate = 80%, Vicat softening point = 80° C) | 450 | g |
| Fumaric acid | 30 | g |
| Ethyl acetate | 700 | g |
| Methanol | 300 | g |
| t-Butyl perpivalate | 1.5 | g |

Under the above polymerization conditions, the charged saponified ethylene-vinyl acetate copolymer retained its original pelletized form and such problems as fusion and agglomeration were not encountered. The polymer obtained by the method to have a melt index of 14.5 g/10 min. and an acid value of 4.8 mg KOH/g. The peeling strength of an aluminum/aluminum bonded structure having an adhesive layer of the polymer obtained above in a thickness of 100μ was 11.3 Kg/25 mm..

When the reaction was conducted in a uniform system by using toluene as the solvent instead of methanol, the polymer had a melt index of 11.2 g/10 min. and an acid value of 4.5 mg KOH/g and the peeling strength of an aluminum/aluminum bonded structure having an adhesive layer of the polymer in a thickness of 100μ was 6.9 Kg/25 mm, whereas that of the saponified ethylene-vinyl acetate copolymer as the starting material was 5.3 Kg/25 mm..

EXAMPLE 11

In the same manner as described in Example 10, the carboxylation reaction was conducted with the following components:

| | |
|---|---|
| Saponified ethylene-vinyl acetate copolymer | |
| (vinyl acetate content = 28%, melt index = 18 g/10 min., saponification rate = 40%, Vicat softening point = 54° C) | 450 g |
| Vinyl acetate | 30 g |
| Fumaric acid | 15 g |
| Ethyl acetate | 700 g |
| Methanol | 300 g |
| t-Butyl perpivalate | 1.5 g |

The polymer obtained retained the original form of the charged copolymer and it was found to have a melt index of 16.5 g/10 min. and an acid value of 2.2 mg KOH/g. The peeling strength of an aluminum-/aluminum bonded structure having an adhesive layer of the polymer obtained above in a thickness of 100μ was 14.7 Kg/25 mm, whereas that of the saponified ethylene-vinyl acetate copolymer was 7.9 Kg/25 mm..

EXAMPLE 12

In the same manner described in Example 10, the carboxylation reaction was conducted with the following components:

| | |
|---|---|
| Saponified ethylene-vinyl acetate copolymer | |
| (vinyl acetate content = 28%, melt index = 400 g/10 min. saponification rate = 80%, Vicat softening point = 67° C) | 450 g |
| Fumaric acid | 30 g |
| Ethyl acetate | 600 g |
| Methanol | 400 g |
| t-Butyl perpivalate | 1.5 g |

The polymer obtained retained the form of the charged copolymer and it was found to have a melt index of 15.3 g/10 min. and an acid value of 3.6 mg KOH/g. The peeling strength of an aluminum-/aluminum bonded structure having an adhesive layer of the polymer obtained above in a thickness of 100μ was 4.5 Kg/25 mm., whereas that of the saponified ethylene-vinyl acetate copolymer was 1.2 Kg/25 mm.

Having now fully described the invention, it will be apparent to one of ordinary skill in the art that many changes and modifications can be made thereto without departing from the spirit or scope of the invention as set forth herein.

What is claimed as now and intended to be secured by Letters patent is:

1. A process for the carboxylation of ethylene-vinyl acetate copolymers or saponified copolymers comprising:
copolymerizing an alpha, beta-unsaturated carboxylic acid and/or anhydride thereof with or without at least one vinylidene monomer having the formula:

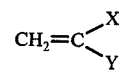

wherein X and Y can be the same or different, and each represents hydrogen, chlorine, alkyl acetoxy, carboxylic acid ester group or cyano; with a solid particulate ethylene-vinyl acetate copolymer or a saponified copolymer in the presence of a polymerization initiator in a reaction medium of an acetic acid ester or a mixture of an acetic acid ester and a lower alcohol, wherein the reaction is conducted in such manner that the copolymer retains its particulate form throughout the reaction.

2. The process of claim 1, wherein the ethylene-vinyl acetate copolymer or the saponified copolymer is used in an amount of 99 to 50 parts by weight and the mixture of said alpha, beta-unsaturated carboxylic acid and/or anhydride thereof and said vinylidene monomer is used in an amount of 1 to 50 parts by weight.

3. The process of claim 2, wherein 0.1 to 20 parts by weight of said alpha, beta-unsaturated carboxylic acid and/or anhydride thereof and 0 to 40 parts by weight of said vinylidene monomer are reacted with 95 to 50 parts by weight of ethylene-vinyl acetate copolymer or saponified copolymer.

4. The process of claim 1, wherein the alpha, beta-unsaturated carboxylic acid and/or anhydride thereof is at least one member selected from the group consisting of acrylic acid, methacrylic acid, maleic acid, fumaric acid, itaconic acid, the methyl and ethyl hydrogen esters of maleic acid and fumaric acid, maleic anhydride and itaconic anhydride, and the vinylidene monomer is at least one member selected from the group consisting of ethylene, propylene, isobutene, butene-1, octene-1, vinyl chloride, vinylidene chloride, vinyl acetate, vinyl chloroacetate, acrlonitrile and alkyl esters of acrylic acid and methacrylic acid.

5. The process of claim 1, wherein the ethylene-vinyl acetate copolymer has a vinyl acetate content of 10 to 40% by weight and a melt index of 0.1 to 500 g/10 min..

6. The process of claim 1, wherein the copolymerization reaction is conducted at a temperature in the range of room temperature to a temperature higher by up to 30° C, than the Vicat softening point of the ethylene-vinyl acetate copolymer.

7. The process of claim 1, wherein the polymerization initiator is selected from the group consisting of dialkyl peroxide, diacyl peroxides, and peroxy esters.

8. The process of claim 1, wherein the polymerization initiator is used in an amount of 0.1 to 50% by weight based on a mixture of the alpha, beta-unsaturated carboxylic acid and/or anhydride thereof and the vinylidene monomer.

9. The process of claim 1, wherein the reaction medium is methyl acetate, ethyl acetate, propyl acetate, butyl acetate or a mixture of 100 parts by weight of said acetic acid ester and up to 50 parts by weight of methanol, ethanol, propanol or butanol.

10. The process of claim 1, wherein the saponified ethylene-vinyl acetate copolymer is produced by saponifying ethylene-vinyl acetate copolymer having 1 to 50% by weight of vinyl acetate in the proportion of from 1 to 100%.

* * * * *